United States Patent
Grach et al.

(10) Patent No.: US 6,736,292 B2
(45) Date of Patent: May 18, 2004

(54) PNEUMATIC RECIPROCATING MOTOR AND GREASE GUN INCORPORATING SAME

(75) Inventors: Ayzik Grach, Chesterfield, MO (US); Viktor V. Alekseyev, St. Louis, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 127 days.

(21) Appl. No.: 10/086,394

(22) Filed: Mar. 1, 2002

(65) Prior Publication Data

US 2003/0164387 A1 Sep. 4, 2003

(51) Int. Cl.$^7$ ................................. G01F 11/00
(52) U.S. Cl. ........................ 222/262; 222/334; 92/181 R
(58) Field of Search ................................. 222/256–263, 222/327, 334, 372, 386; 92/181 R, 182, 183

(56) References Cited

U.S. PATENT DOCUMENTS

| | | | |
|---|---|---|---|
| 1,965,038 A | | 7/1934 | Hartman |
| 2,183,013 A | | 12/1939 | Davis |
| 2,254,716 A | | 9/1941 | Veit |
| 2,505,839 A | * | 5/1950 | Scovell ............ 222/262 |
| 2,928,574 A | | 3/1960 | Wagner |
| 3,218,980 A | | 11/1965 | Arnes |
| 3,282,167 A | | 11/1966 | McKenzie |
| 3,325,995 A | | 6/1967 | Buhro |
| 3,448,658 A | | 6/1969 | Arnes |
| 3,597,121 A | | 8/1971 | McClocklin |
| 4,150,819 A | * | 4/1979 | Taylor ............... 267/136 |
| 4,328,972 A | * | 5/1982 | Albertson et al. ..... 277/309 |
| 4,352,644 A | | 10/1982 | Landrum et al. |
| 4,402,383 A | * | 9/1983 | Bailey ................ 181/202 |
| 5,067,591 A | | 11/1991 | Fehlig |
| 5,341,723 A | | 8/1994 | Hung |
| 5,474,214 A | | 12/1995 | Chung et al. |
| 5,779,105 A | | 7/1998 | Brown et al. |
| 6,012,377 A | | 1/2000 | Hung |
| 6,494,347 B1 | * | 12/2002 | Yeh ............... 222/262 |

OTHER PUBLICATIONS

Parker Seals, "Molygard Wear Rings", revised Jul. 1, 1993, PPD–3400, Parker Hannifin Corporation, Engineered Polymer Systems Division, Slat Lake City, UT 84119 (obtained from http://www.parker.com/packing/cat/english/3400.pdf).*

Parker Seals, "PSP Wear Seals", Copyright 1997, Product Bulletin No. 5238B1–USA, Parker Hannifin Corporation, Packing Division, Slat Lake City, UT 84119, Phone: 801–972–300 (obtained from http://www.parker.com/packing/cat/english/5238.pdf).*

"Napa® Lifting Equipment–Model 91–622 Shop Press (50 Ton) Series B" Owners Manual, Copyright 1990, One Lincoln Way, St. Louis MO 63120–1578 (pp. 1,3,4 and 6).

Parker Packing, "Recommended Installation Chamfer for PSP Seals", Apr. 7, 1983, Parker Packing, Salt Lake City, Utah, (2 Pages).

Photographs of Y–13 Series Air/Hydraulic Pump, OTC ® Tools & Equipment, Divison of Owatonna Tool Company, Owatonna Minnesota 55060, Undated, (11 Pages).

* cited by examiner

Primary Examiner—Gene Mancene
Assistant Examiner—Patrick Buechner
(74) Attorney, Agent, or Firm—Senniger, Powers, Leavitt & Roedel

(57) ABSTRACT

A grease gun having a compressed-air-operated reciprocating motor for reciprocating a pump plunger through forward and return strokes. The motor comprises a motor cylinder and a motor piston operable in the cylinder and itself acting as a valve for effecting its return through each return stroke.

9 Claims, 10 Drawing Sheets

PNEUMATIC RECIPROCATING MOTOR AND GREASE GUN INCORPORATING SAME

This invention relates generally to a pneumatic (compressed-air-operated) reciprocating motor, more particularly to pumping apparatus incorporating the motor and especially to a compressed-air-operated grease gun including the motor for pumping grease.

In one embodiment, the invention involves a grease gun of the type disclosed in the co-assigned U.S. Pat. No. 5,779,105, issued Jul. 14, 1998, entitled Air Operated Grease Gun ("the '105 patent"), having been developed as an improvement on the commercial version of the gun disclosed in the '105 patent. While the latter gun has been generally satisfactory, it is subject to shortened life, necessitating early repair of its motor, due to impact involved in operation of the motor. Further, the plunger of the motor has a tendency to jam on occasion.

BRIEF SUMMARY OF THE INVENTION

Accordingly, among the several objects of the invention may be noted the provision of a pneumatic grease gun, i.e., a compressed-air-operated grease gun and a pneumatic (compressed-air-operated) reciprocating motor used in the gun having a longer useful life (without repair) than the gun of the '105 patent (its predecessor); the provision of pump apparatus used in the gun having a reciprocating pump plunger less subject to jamming than that of the predecessor; and the provision of a gun which is relatively lighter in weight, less noisy in operation, and more economical to manufacture than its predecessor.

In general, the pneumatic reciprocating motor of the invention comprises a motor cylinder having a head end and a rod end, and a motor piston reciprocable in the cylinder having a forward and a back side. The motor piston is reciprocable through a forward stroke toward the rod end of the cylinder and a return stroke back toward the head end and is biased to return back through a return stroke. A piston rod extends forward from the motor piston through the rod end of the cylinder and is reciprocable by the motor piston. The cylinder has an air inlet for admission of compressed air thereto on the back side of the motor piston for driving it forward through a forward stroke against the return bias and an air outlet on the forward side of the motor piston for venting air. The motor piston has through passaging extending from its forward side to its back side, and a valve movable therein relative thereto between a position blocking said through passaging and a position unblocking said through passaging. The cylinder and motor piston have auxiliary passaging for delivery of air under pressure from the back side of the motor piston to move the valve to its said through-passaging-unblocking position at the conclusion of a forward stroke of the motor piston, the motor piston acting as a valve and opening the auxiliary passaging at the conclusion of the forward stroke of the motor piston.

In general, the present invention is also directed to pumping apparatus comprising a motor as outlined in the preceding paragraph with the piston rod thereof constituting the plunger of the pump. A grease gun of this invention comprises the pumping apparatus for pumping grease from a grease supply container appended thereto.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION

Figure 1:
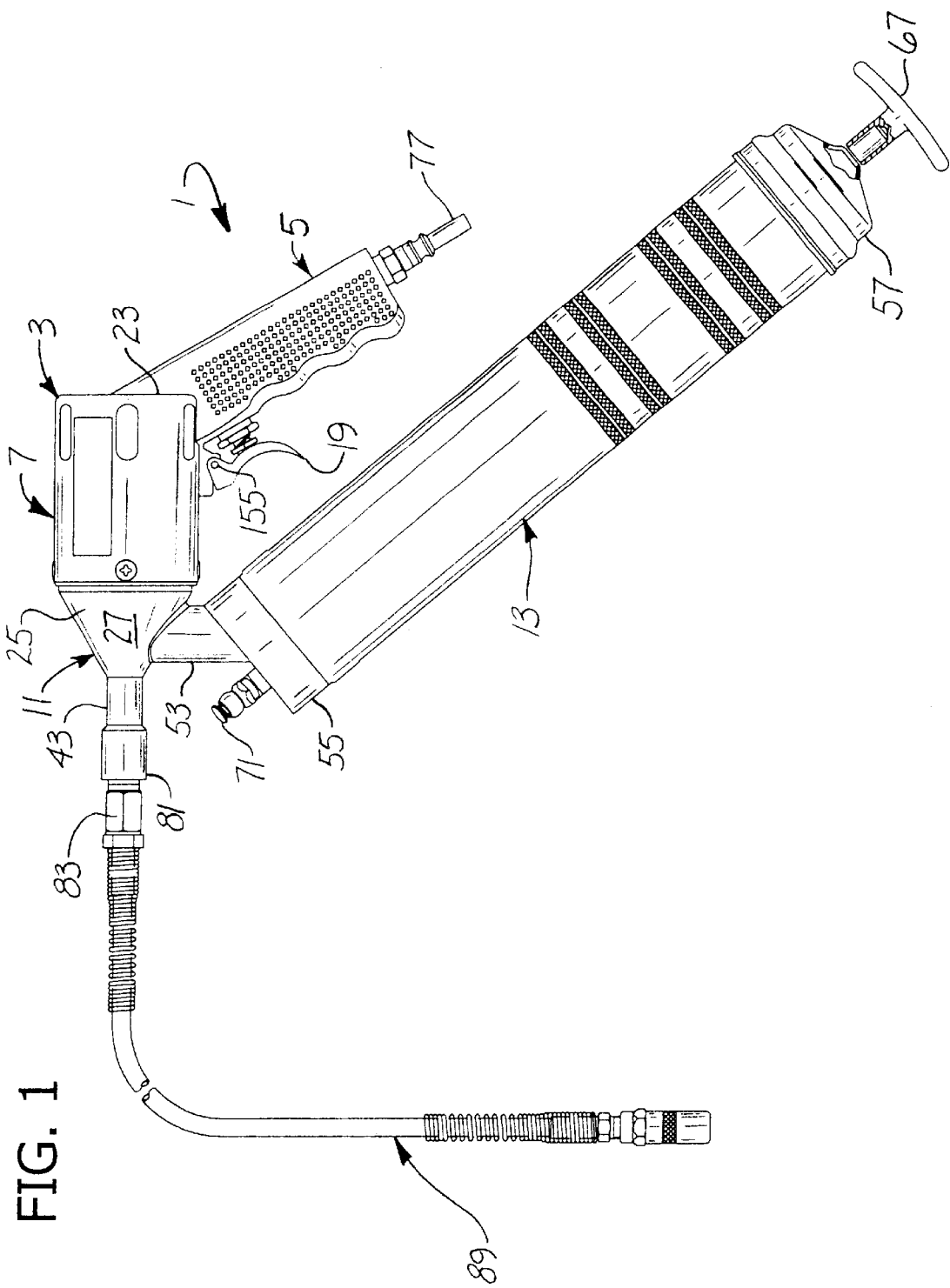
FIG. 1 is a view in side elevation of a grease gun embodying the invention.

Referring first to FIG. 1, a grease gun of this invention, designated 1 in its entirety, is shown to comprise a motor/pump unit, designated 3 in its entirety, at the upper end of a knurled pistol-grip handle 5, extending forward from the handle. The motor/pump unit comprises pneumatically operated (compressed-air-operated) reciprocating motor 7 for reciprocating a plunger 9 (see FIGS. 3–5) of a pump 11 back and forth for pumping grease from a grease supply container 13 appended to the pump 11 extending down therefrom and angled toward the handle. Compressed air for operating the motor 7 for reciprocation of the plunger 9 is supplied to the motor through passaging 15 in the handle 5 under control of a valve 17 operable by a trigger 19.

Figure 3:
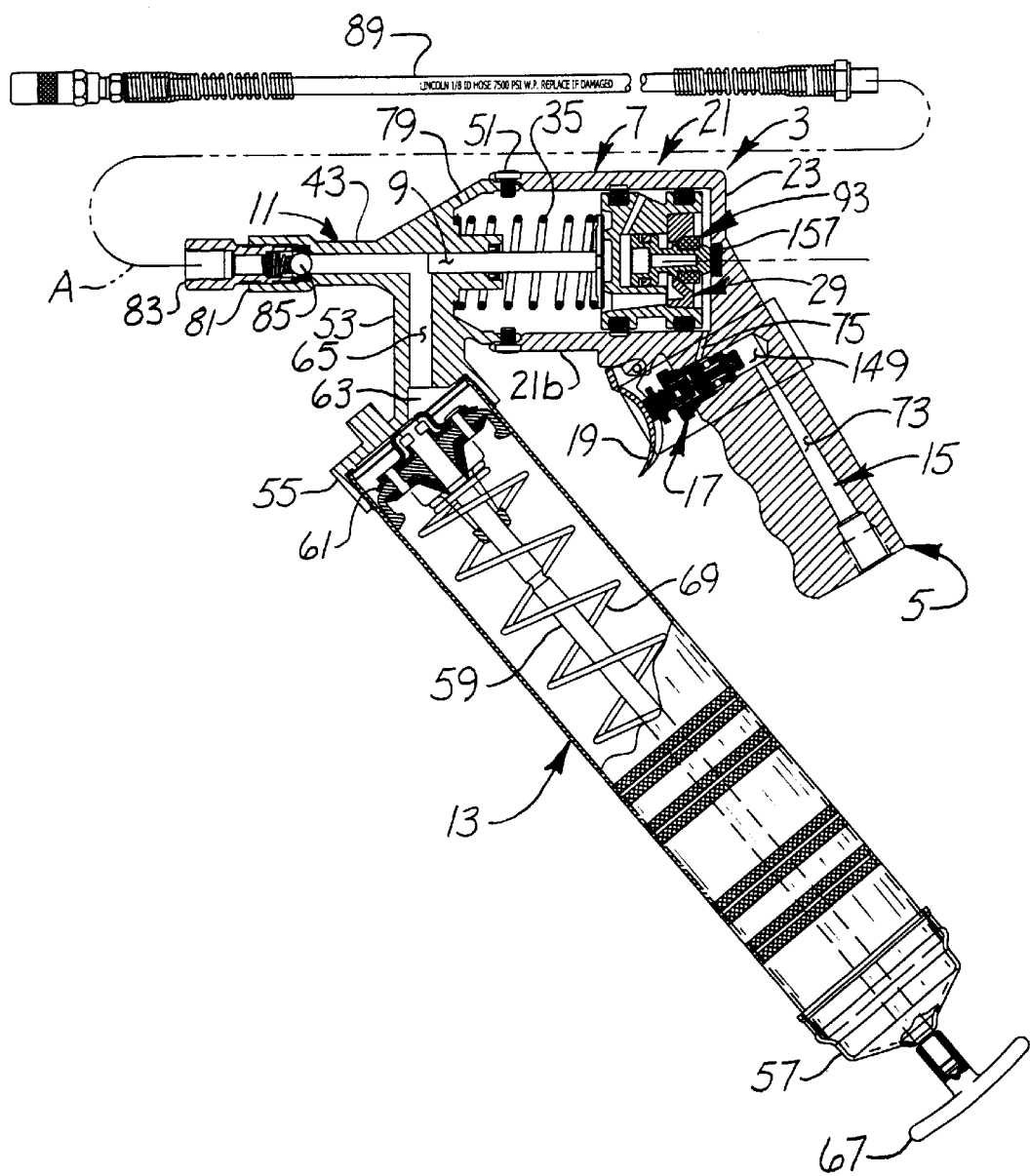
FIG. 3 is a view generally in section on line 3—3 of FIG. 2.
Figure 4:
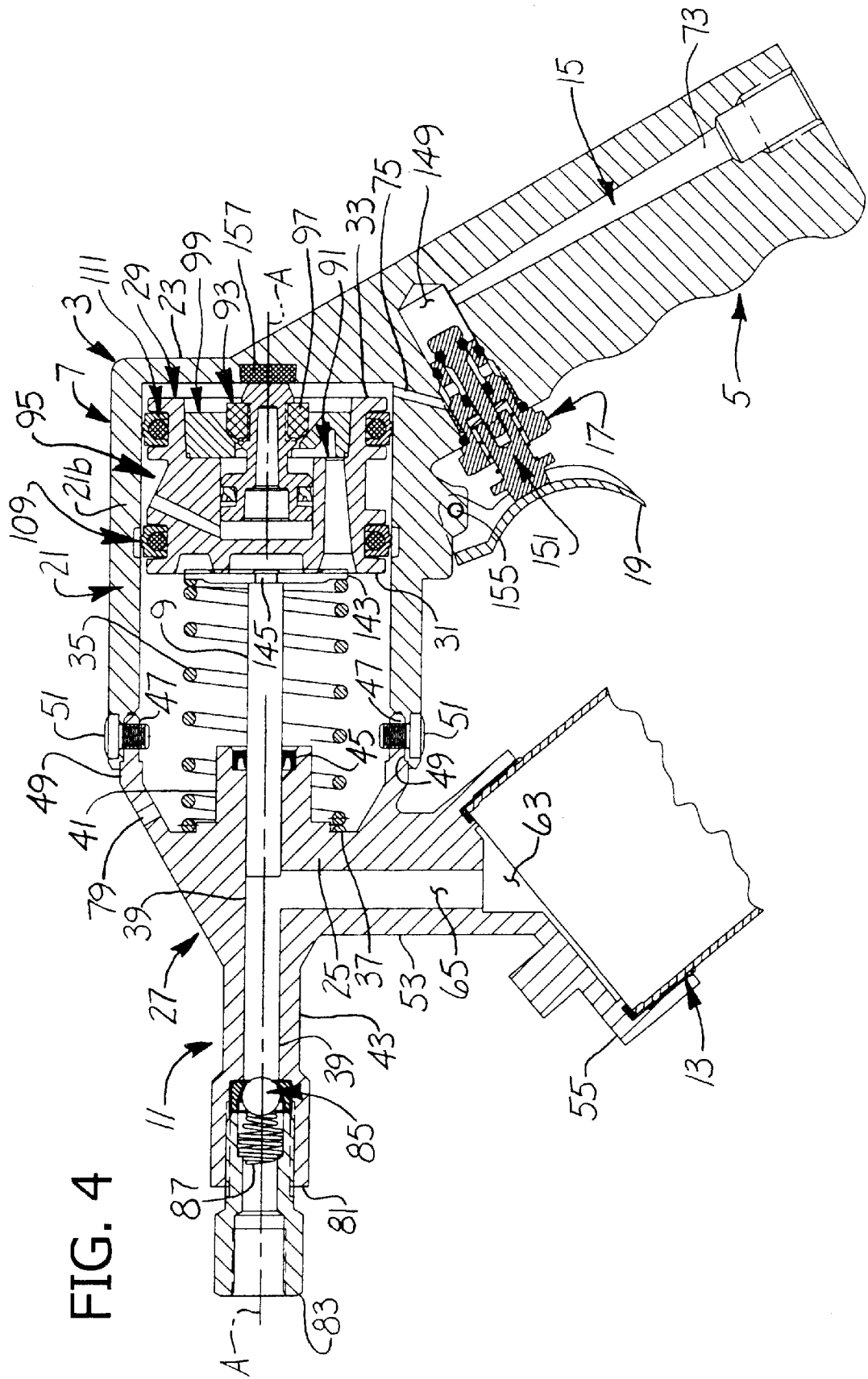
FIG. 4 is an enlarged fragment of FIG. 3.
Figure 5:
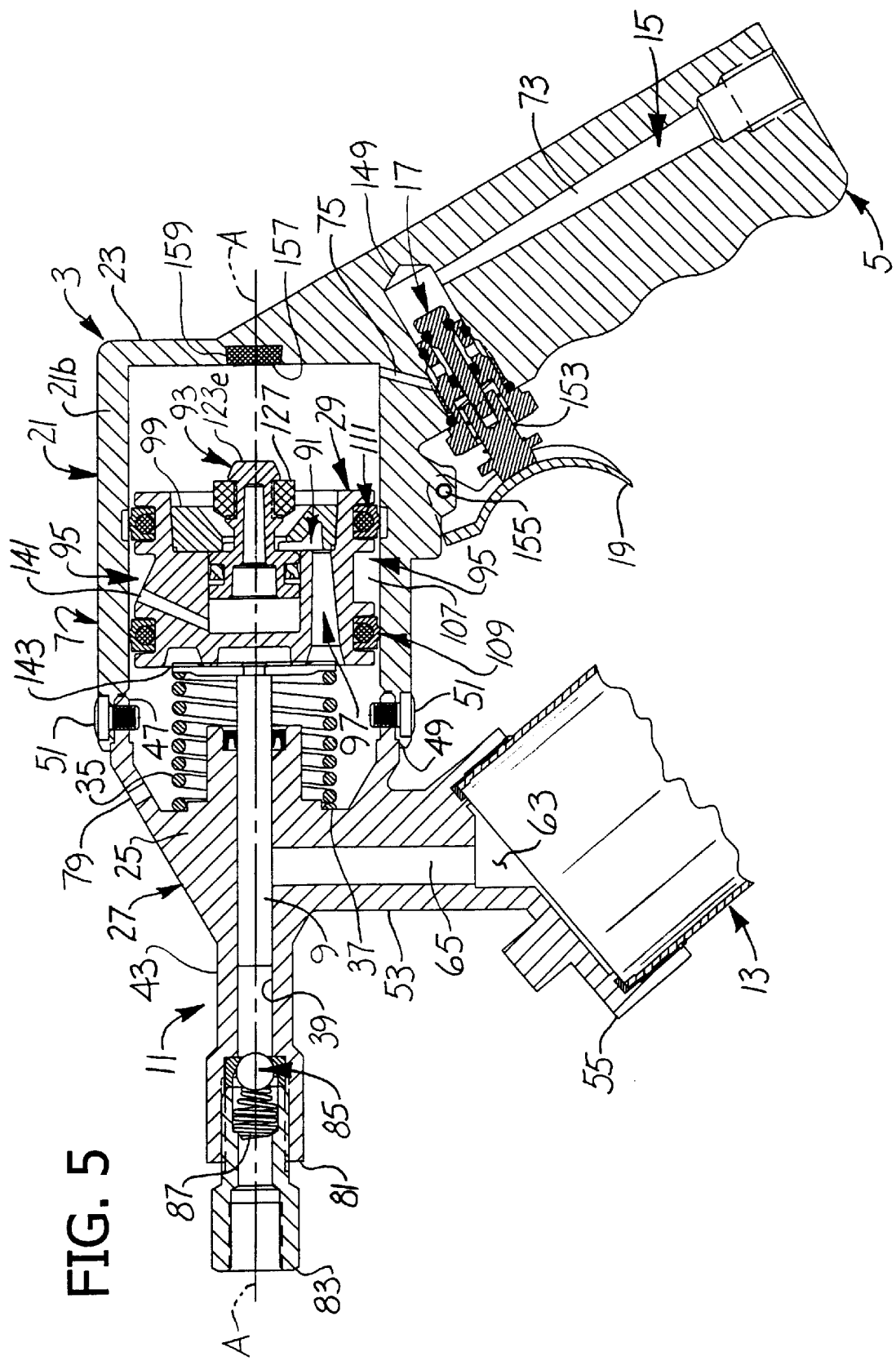
FIG. 5 is a view corresponding to FIG. 4 showing a moved position of parts.
Figure 7:
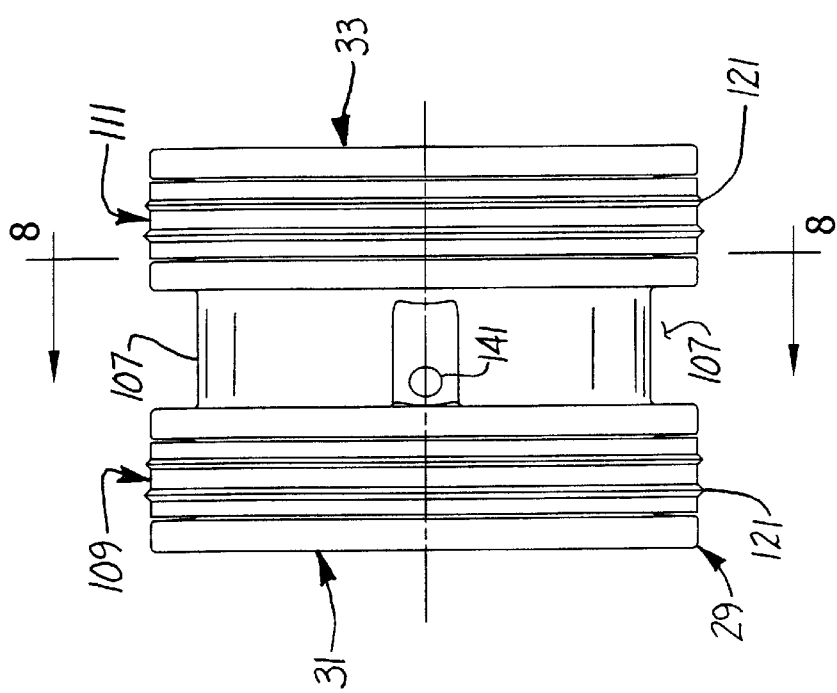
FIG. 7 is a view in side elevation of the motor piston.
Figure 6:
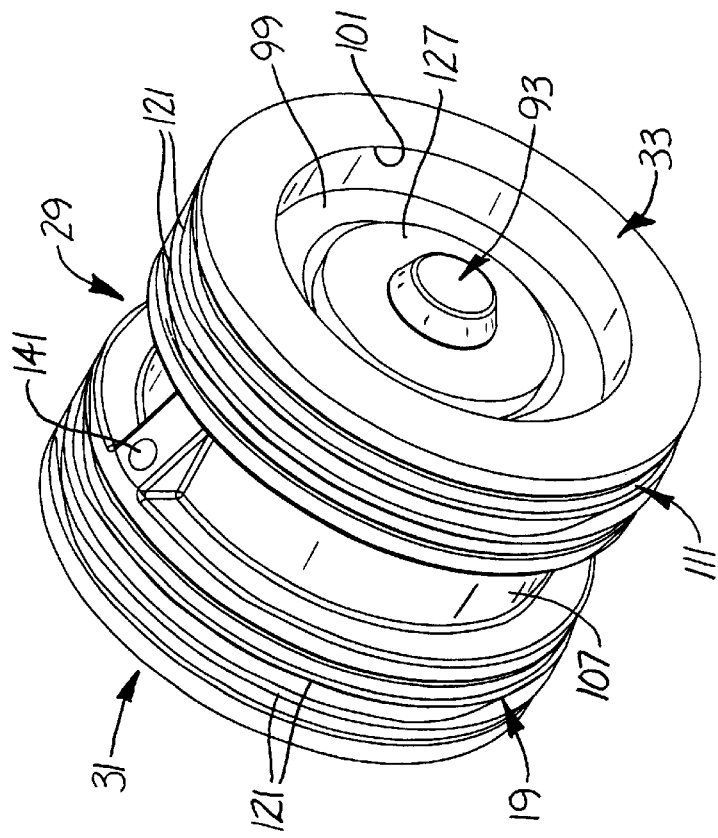
FIG. 6 is a perspective of a motor piston of the grease gun.
Figure 9:
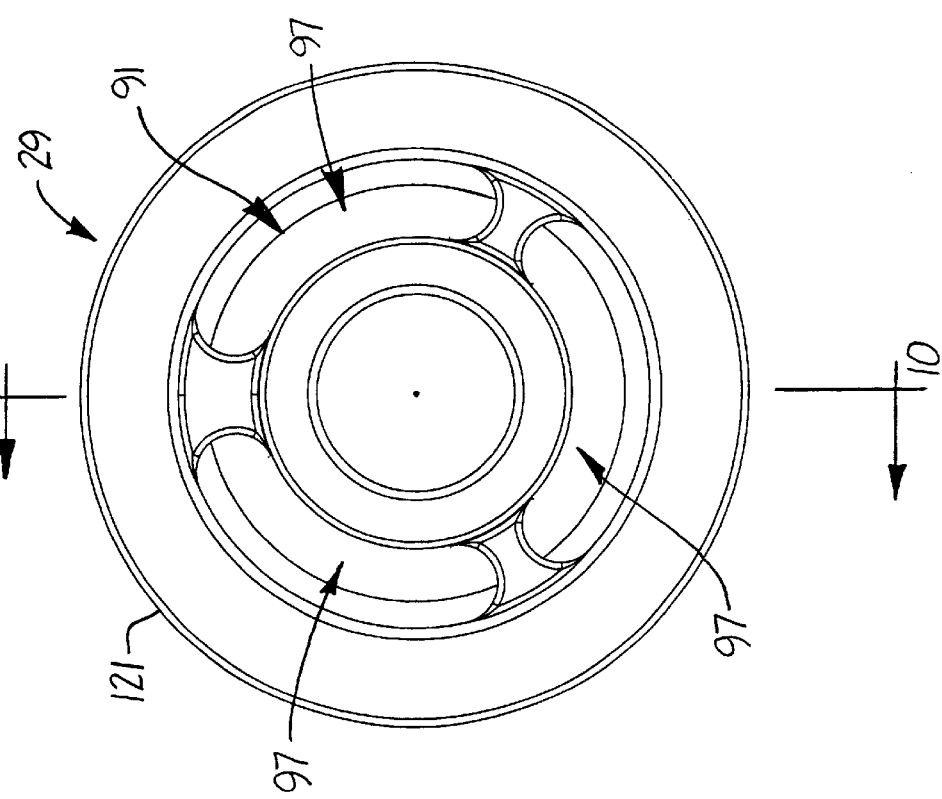
FIG. 9 is a left end view of FIG. 7.
Figure 8:
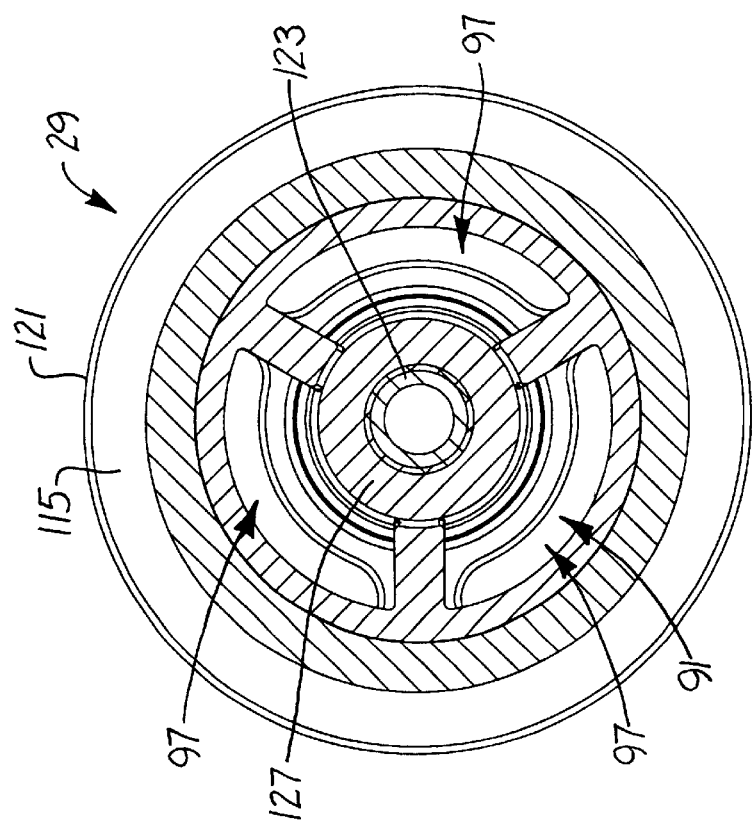
FIG. 8 is a transverse section of the motor piston taken generally on line 8—8 of FIG. 7.
Figure 11:
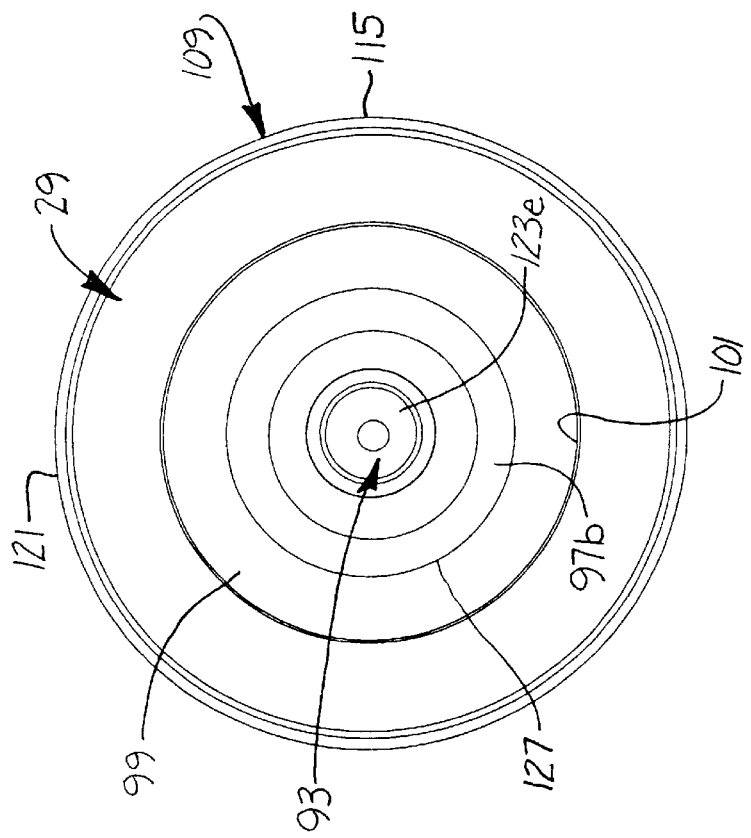
FIG. 11 is a right end view of FIGS. 7 and 11.

The motor comprises a cylinder 21 extending forward from the upper end of the pistol-grip handle 5, the axis of the cylinder being indicated at A—A in FIGS. 3–5. As shown in FIGS. 3–5, the cylindrical body 21b and head end 23 of the cylinder (its rearward end) and the pistol-grip handle 5 are of integral construction, preferably being made as one piece from a suitable material such as ANSI 380 die cast aluminum alloy. The rod end 25 (the forward end) of the cylinder is an attached component, as will be subsequently detailed, constituted by part of the body 27 of pump 11.

A piston 29, which is preferably made of a suitable plastic, such as a polyamide, is reciprocable in the cylinder 21. The piston 29, constituting the motor piston, has a forward side 31 and a back side 33 (FIGS. 6–11). It is reciprocable through a forward stroke from the retracted position of FIGS. 3 and 4 adjacent the head end 23 of the cylinder 21 toward the rod end 25 of the cylinder to the extended position shown in FIG. 5, and through a return stroke back toward the head end 23, being subject to the bias of a spring 35 to return it back through the return stroke. The spring 35 is a coil compression spring extending axially in the cylinder seated at its forward end as indicated at 37 on the rod end 25 of the cylinder and acting against the piston to bias it rearward in the cylinder. The pump plunger 9 is constituted by the piston rod of the motor, the plunger or piston rod 9 extending forward from the piston through an axial bore 39 in the rod end 25 of the cylinder 25, including an axial projection 41 extending rearward from the rod end 25, and through an elongate forward extension 43 constituting the pump tube of the pump body 27. A seal 45 is provided for the plunger at the rearward end of projection 41. The forward end of spring 35 surrounds projection 41. The rod end 25 of the cylinder 21, constituted by the rearward part of the pump body 27, has a rearwardly extending annular wall 47 extending into an annular internal groove 49 in the forward end of cylinder 21. The wall 47 is secured in the groove 49 as by screws 51.

Figure 2:
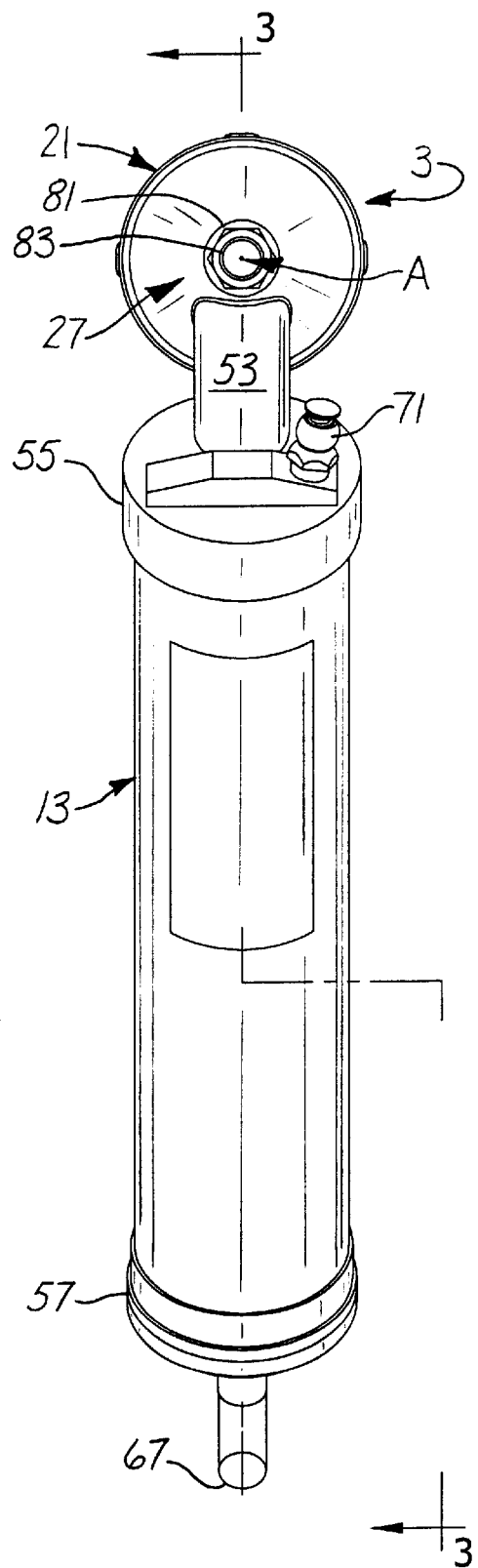
FIG. 2 is an end view of the gun as viewed from the left of FIG. 1 omitting a hose.

In the embodiment shown in FIG. 3, the pump body 27 has a downwardly extending protuberance 53 formed at the lower end thereof with an internally threaded cap 55 for closing the upper end of the grease supply container 13 and for attaching the container to the gun 1. The container 13 is a cartridge-type grease container comprising an elongate cylindrical receptacle having a lower end cap 57. In the receptacle at the upper end of a follower rod 59 is a follower 61 for forcing the supply of grease in the receptacle upward and out through a hole 63 in the cap 55 and a grease passage 65 in the protuberance 53 into the bore 39. The follower rod 59 is slidable in the cap 57 and has a handle 67 for pulling it out against the bias of a spring 69 in the receptacle and being turned to lock it in fully extended position by conventional means. The receptacle is supplied loaded with grease (the follower 61 being fully retracted by the follower rod 59 against the bias of spring 69) and is closed at what amounts to its upper end by a plastic cap. With the plastic cap removed, the receptacle is screwed at its upper end into the cap 55 and the follower rod 59 and follower 61 released to urge the grease in the receptacle upward in response to the upward bias of spring 69. The cap 55 is provided with a vent valve 71 (FIGS. 1 and 2).

In one embodiment, passaging 15 comprises a passage 73 extending from the end of the handle 5 to the valve 17 and passage 75 extending from the valve 17 to the cylinder 21 constituting an air inlet for the cylinder for supplying compressed air thereto in back of the piston 29. A compressed air hose 77 such as the usual shop air hose (see FIG. 1) is connected to the lower end of the handle 5 for supplying compressed air to passage 73, thence to the air inlet 75 of the cylinder on operation of the trigger 19 to open valve 17 for communication of passages 73 and 75. Cylinder 21 is shown as having an air outlet 79 on the forward side of piston 29 for venting air. It may have more than one.

The pump tube 43 has a slightly enlarged outer or distal end 81 containing a fitting 83 in which there is a check valve 85 biased by spring 87 toward closure of the pump tube bore 39. With the motor piston 29 in retracted position (FIG. 4), the forward end of the pump plunger 9 (the piston rod) lies rearward of the grease passage 65. The arrangement is such that, passage 65 and bore 39 being primed with grease, on a forward stroke of the pump plunger 9 (to the left as viewed in FIG. 4) in bore 39, a shot of grease is forced out of the fitting 83, the check valve 85 opening for the delivery. A lubricant delivery hose 89 may be connected to the fitting 83.

The motor piston 29, shown per se in FIGS. 6–11, has passaging, designated 91 in its entirety, extending therethrough from its forward side 31 to its backside 33. A valve, designated 93 in its entirety, is movable in the motor piston relative to the motor piston between the FIGS. 3, 4, 10 position blocking passaging 91 and the FIG. 5 position unblocking passaging 91. The cylinder 21 and piston 29 have passaging designated 95 in its entirety (denoted auxiliary passaging) for delivery of air under pressure from the chamber in the cylinder 21 on the back side of the motor piston to move the valve 93 from its FIG. 4 position blocking through passaging 91 to its FIG. 5 position unblocking through passaging 91 at the conclusion of a forward stroke of the motor piston 29, the motor piston 29 itself acting as a valve and opening the valve-pressurizing passaging 95 at the conclusion of the forward stroke of the motor piston.

Figure 10:
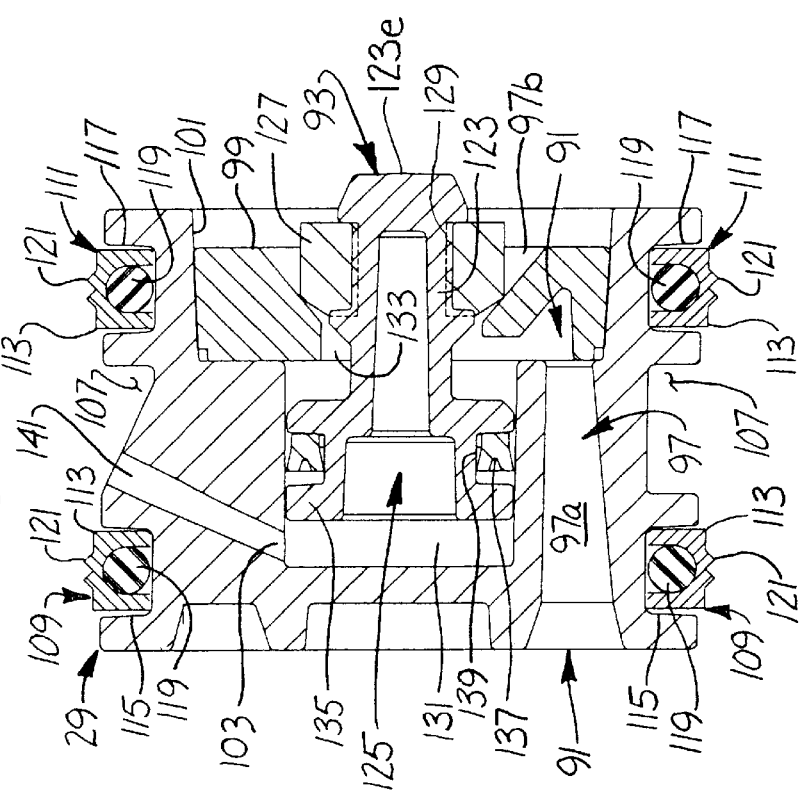
FIG. 10 is a longitudinal section of the piston taken generally on line 10—10 of FIG. 9.

The through passaging 91 in the motor piston 29 comprises three passages each designated 97 extending lengthwise of the motor piston spaced at intervals (e.g., 120° intervals) around the axis of the motor piston (which coincides with axis A—A of the cylinder 21). As shown in FIG. 10, each passage 97 has a forward component 97a extending lengthwise of the piston in the body of the piston and a rearward end component 97b in an insert 99 constituting a valve seat secured in a recess 101 in the rear end of the piston and constituting a part thereof. The valve 93 is movable axially in and relative to the motor piston 29 between its FIG. 4 position engaging the valve seat 99 blocking the through passaging 91 (i.e. blocking all three through passages 97) and its FIG. 5 position unblocking the through passaging 91 (i.e unblocking all three through passages 97). The specific configuration of the through passaging 91 may vary without departing from the scope of this invention.

The aforesaid auxiliary passaging 95 comprises, in one embodiment, an internal recess 105 in the cylinder 21 and an external recess 107 in the motor piston 29. The recess 105 is an annular recess extending all around the interior of the cylinder 21 spaced from the head end 23 of the cylinder 21 a distance defining the forward stroke of the piston 29. The recess 107 is an annular recess extending all around the periphery of the piston 29 between a forward seal 109 on the piston adjacent its forward end and a rearward seal 111 on the piston adjacent its rearward end for slidingly sealing the piston in the cylinder 21. Each seal 109, 111 comprises a flexible channel-section ring 113 (see FIG. 10) seated in a peripheral groove 115, 117 in the piston 29, ring 113 having an elastomeric (rubber) ring 119 therein. The periphery of ring 113 (which seals against the interior cylindrical surface of the cylinder 21) has a ribbed formation 121.

Referring again to FIG. 10, the valve 93 of a preferred embodiment has a stem 123 slidable in a hole designated 125 in its entirety extending longitudinally of the motor piston 29 on the axis A—A of the cylinder 21 (and the piston 29). The stem 123 has a head 127 thereon adjacent its rearward end engageable with the valve seat 99 to close off the through passaging 91, more particularly to close off the three passages 97 at their rearward ends in the valve seat 99. The head 127 comprises an annular elastomeric (e.g. grease-resistant rubber) member set in a groove 129 adjacent the rearward end 123e of the stem. The hole 125 has a forward end portion 131 formed as and constituting an auxiliary cylinder and a rearward end portion 133. The valve stem 123 is formed as piston 135 (denoted the auxiliary piston) at its forward end, the auxiliary piston 135 being sealingly slidable in the auxiliary cylinder 131 in the motor piston 29, the auxiliary piston 135 having a seal 137 retained in a groove 139 therein. Passaging 103 includes an angled passage 141 extending from recess 107 in the motor piston 29 to the auxiliary cylinder 131 on the forward side of the auxiliary piston 135.

The coil compression motor piston return spring 35 acts on the forward end of the motor piston 29 at the rearward end of the spring 35 (its right end as illustrated in FIGS. 3, 4, 5 and 10) via a spring seat 143 constituted by a disk slidable radially in all directions on the forward face of the motor piston 29. The piston rod 9 (the pump plunger) extends forward from the disk, having a reduced-diameter rearward end 145 received in a central hole in the disk. This arrangement avoids jamming of the piston rod 9 (the plump plunger).

The detailed construction of the compressed air inlet valve 17 is not critical, and it should suffice to point out that as best shown in FIGS. 4, 5, 13, and 14 it comprises a valve seat 147 in a recess 149 in the handle 5 supplied with compressed air via passage 73 in the handle, and a valve member assembly 151 biased by spring 153 to a closed position blocking passage 75 from passage 73 and movable on pulling the trigger 19 to an open position for delivery of compressed air via passage 15 to the back end of the motor cylinder 21. The trigger is pivoted at 155 on the handle 5. Operation is as Follows:

On pulling the trigger 19, and maintaining it pulled, compressed air is supplied from the shop hose 77 via passage 73, the trigger-operated valve 17 and passage 75 to the chamber in the cylinder 21 on the back side 33 of the motor piston 29. The motor piston 29 is thereupon relatively rapidly reciprocated in cycles each involving a forward stroke of the motor piston 29 from the FIG. 4 (and FIG. 3) retracted position adjacent the head end 23 of cylinder 21 to the FIG. 5 forward position, and a return stroke back to the FIG. 4 retracted position. The valve 93 in the motor piston is closed for each forward stroke (how will be made subsequently clear) blocking the through passaging 91 (all three through passages 97) in the motor piston 29 and thereby keeping compressed air on the back side 33 of the motor piston from escaping through passaging 91 and enabling the forward stroke. In moving through the forward stroke, the motor piston 29 compresses spring 35, thereby augmenting its force biasing the piston 29 rearward. The motor chamber on the front side 31 of the motor piston is vented via the vent (or vents) 79 on each forward stroke of the motor piston 29. The blocking of the through passaging 91 (the three passages 97) occurs by reason of the engagement of the resilient valve head 127 with the valve seat 99 (see FIGS. 4 and 10).

Figure 12:
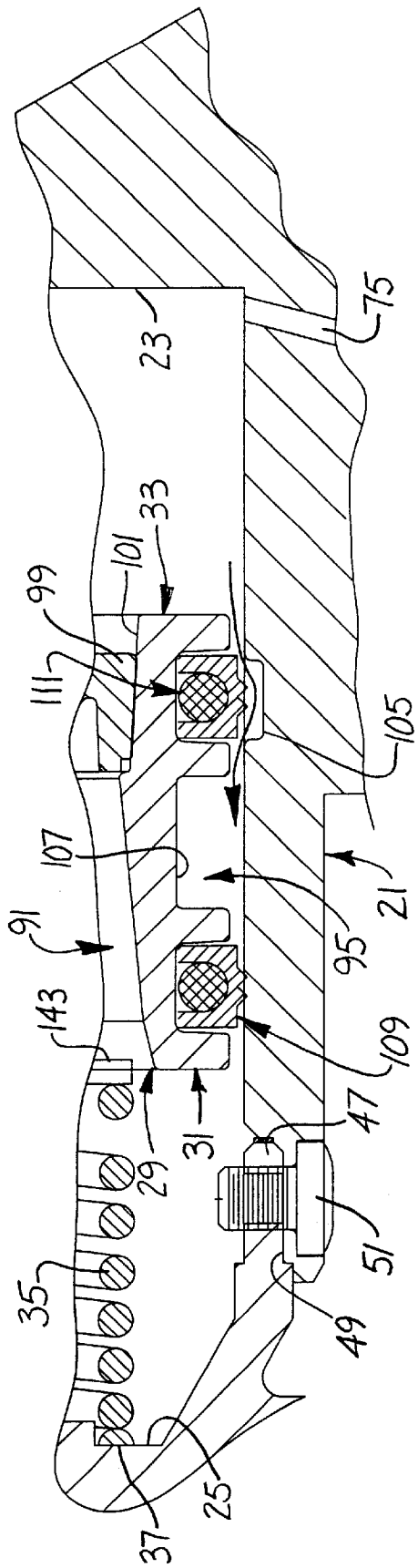
FIG. 12 is an enlarged fragment of FIG. 5.
Figure 14:
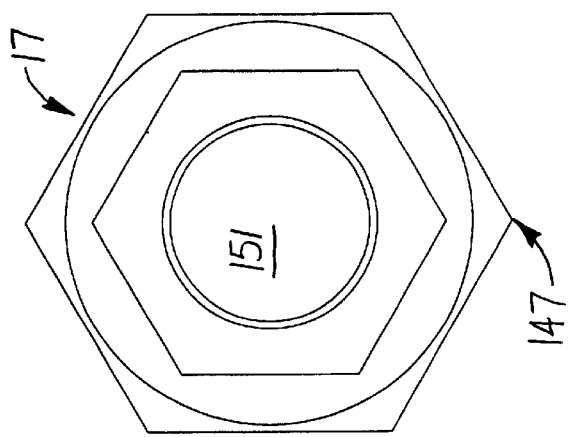
FIG. 14 is a left end view of FIG. 13.
Figure 13:
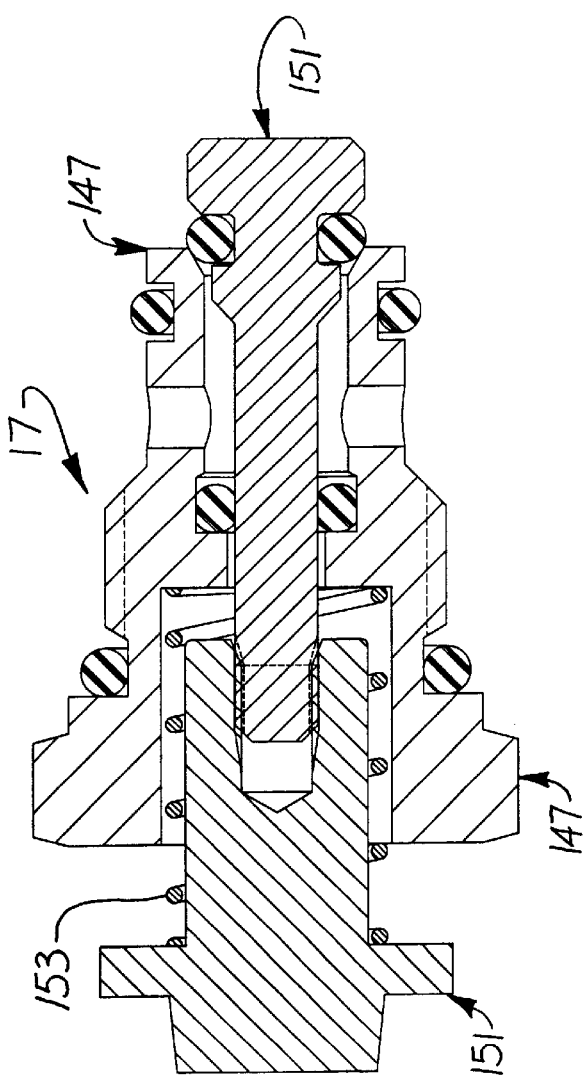
FIG. 13 is a view in section of a trigger-operated valve of the gun.

Each return (rearward) stroke of the motor piston 29 is initiated in response to the rearward motor piston seal 111 reaching the recess 105 in the cylinder 21 as shown in FIGS. 5 and 12, in the course of the forward movement of the seal 111 with the motor piston 29, allowing compressed air to flow from the chamber on the back side 33 of the motor piston 29 via auxiliary passaging 95 to the auxiliary cylinder 131 (which may be denoted the valve cylinder) on the forward side of the auxiliary piston 135 (the valve piston). This valve-actuating flow of compressed air to the auxiliary cylinder 131 is via recess 105 in cylinder 21 to recess 107 in the motor piston 29 as illustrated by the arrow in FIG. 12, and from recess 107 through passage 141 (FIG. 10) to the chamber on the forward side of the auxiliary piston 135 (the valve piston) resulting in rearward movement of valve 93 relative to the motor piston 29 to the FIG. 5 open position unblocking the through passaging 91 (passages 97), by reason of the head 127 of the valve 93 moving away from the valve seat 99. With the through passaging 91 unblocked, air escapes from the chamber in cylinder 21 on the rearward side 33 of the motor piston 29 to the chamber in cylinder 21 on the forward side of the motor piston 29 and is vented via vent hole (or holes) 79. The air pressure on the back side 33 and the air pressure on forward side of the motor piston 29 are thereby generally equalized and the motor piston return spring 35 takes over and returns (pushes) the motor piston 29 back rearward through the return stroke.

On the return of the motor piston 29, carrying with it the valve 93, the rearward end 123e of the valve 93 engages the head end 23 of the cylinder 21 and stops moving (momentarily). The motor piston 29 continues its rearward (return) movement for a brief interval, sliding rearward with respect to the now-arrested valve 93 to the point of engagement of the valve seat 99 with the valve head 127 and thereby effecting closure of the valve 93 (blocking of the through passaging 91) for the ensuing forward stroke of the motor piston. Noise level is considerably reduced by providing for sound-deadening engagement of the rearward end 123e of the valve 93 with a cushion 157 constituted by a disk of elastomeric material (e.g. rubber) lodged in a recess 159 in the head end 23 of the cylinder, as illustrated in FIGS. 4 and 5.

On each forward stroke of the motor piston 29, the piston rod 9 serving as the plunger of pump 11 moves forward through a pressure stroke crossing the pump inlet 65 to deliver a shot of grease to the fitting 83 (and thence through the hose 87), the check valve 85 opening for this delivery. And on each return stroke, the pump 11 is recharged.

Of special note is the enablement of the manufacture of the body of the motor piston 29 as an injection molded plastic part (a one-piece part) of relatively light weight, contributing to the ease of handling the gun 1. The construction also enables use of a relatively light return spring, allowing the gun to operate at relatively lower air pressure (e.g. at 40 p.s.i.). Another noteworthy feature is the ability to stall against back pressure resulting from an attempt to lubricate a blocked bearing or grease fitting.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

It will be understood that the pneumatic reciprocating motor and pumping apparatus of this invention can have applications other than in a grease gun.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A pneumatic reciprocating motor comprising:
   a motor cylinder having a head end and a rod end;
   a motor piston reciprocable in the cylinder, said motor piston having a forward side and a back side, said motor piston being reciprocable through a forward stroke toward the rod end of the cylinder and a return stroke back toward the head end and being biased to return back through a return stroke;
   a piston rod extending forward from the motor piston through the rod end of the cylinder reciprocable by the motor piston;
   said cylinder having an air inlet for admission of compressed air thereto on the back side of the motor piston for driving it forward through a forward stroke against the return bias and an air outlet on the forward side of the motor piston for venting air;
   said motor piston having through passaging extending from its forward side to its back side;
   a longitudinally extending hole in the motor piston;
   a valve movable in the longitudinally extending hole in the motor piston between a position blocking said through passaging and a position unblocking said through passaging;

seals seated in grooves in the motor piston adjacent the forward end and rearward end of the motor piston, each seal comprising a channel-section ring, an O-ring positioned in a channel of the channel-Section ring, and a ribbed formation on a periphery of the channel-section ring for slidably sealing against an interior surface of the motor cylinder; and auxiliary passaging comprising an internal recess in the motor cylinder, an annular peripheral groove in the motor piston and a passage from said annular peripheral groove to said longitudinally extending hole in the motor piston, said auxiliary passaging being adapted to deliver air under pressure from the back side of the motor piston to move the valve to its said through-passaging-unblocking position at the conclusion of a forward stroke of the motor piston.

2. A pneumatic reciprocating motor as set forth in claim 1 wherein said channel-section ring and O-ring are flexible.

3. A pneumatic reciprocating motor as set forth in claim 1 further comprising a recess in the back side of the motor piston, and an insert secured in the recess defining a valve seat having a conical surface adapted for engagement by a head of the valve, said through passaging having a component extending through said insert.

4. A pneumatic reciprocating motor as set forth in claim 1 further comprising a handle on the motor cylinder, a pump tube extending forward from the rod end of the cylinder, and a cap for attachment of a container holding grease under pressure for supplying the pump tube with grease, said piston rod extending forward into the pump tube and being reciprocable by the motor piston to dispense grease from the pump tube.

5. A pneumatic reciprocating motor as set forth in claim 1 further comprising a pad on the head end of the motor cylinder, said pad being positioned for engagement by a rearward end of the valve for deadening the sound on impact of the valve against the pad on each return stroke of the motor piston.

6. A pneumatic reciprocating motor as set forth in claim 5 wherein said pad is positioned in a recess in the head end of the motor cylinder.

7. A pneumatic reciprocating motor comprising:

a motor cylinder having a head end and a rod end;

a motor piston reciprocable in the cylinder, said motor piston having a forward side and a back side, said motor piston being reciprocable through a forward stroke toward the rod end of the cylinder and a return stroke back toward the head end and being biased to return back through a return stroke;

a piston rod extending forward from the motor piston through the rod end of the cylinder reciprocable by the motor piston;

said cylinder having an air inlet for admission of compressed air thereto on the back side of the motor piston for driving it forward through a forward stroke against the return bias and an air outlet on the forward side of the motor piston for venting air;

said motor piston having through passaging extending from its forward side to its back side;

a longitudinally extending hole in the motor piston;

a valve movable in the longitudinal extending hole in the motor piston between a position blocking said through passaging and a position unblocking said through passaging;

auxiliary passaging comprising an internal recess in the motor cylinder, an annular peripheral groove in the motor piston and a passage from said annular peripheral groove to said longitudinally extending hole in the motor piston, said auxiliary passaging being adapted to deliver air under pressure from the back side of the motor piston to move the valve to its said through-passaging-unblocking position at the conclusion of a forward stroke of the motor piston; and a pad on the head end of the motor cylinder positioned for engagement by a rearward end of the valve for deadening the sound on impact of the valve against the pad on each return stroke of the motor piston.

8. A pneumatic reciprocating motor as set forth in claim 7 wherein said pad is secured in a recess in the head end of the motor cylinder.

9. A pneumatic reciprocating motor comprising:

a motor cylinder having a head end and a rod end;

a motor piston reciprocable in the cylinder, said motor piston having a forward side and a back side, said motor piston being reciprocable through a forward stroke toward the rod end of the cylinder and a return stroke back toward the head end and being biased to return back through a return stroke;

a piston rod extending forward from the motor piston through the rod end of the cylinder reciprocable by the motor piston;

said cylinder having an air inlet for admission of compressed air thereto on the back side of the motor piston for driving it forward through a forward stroke against the return bias and an air outlet on the forward side of the motor piston for venting air;

said motor piston having through passaging extending from its forward side to its back side;

a longitudinally extending hole in the motor piston;

a valve movable in the longitudinal extending hole in the motor piston between a position blocking said through passaging and a position unblocking said through passaging;

a recess in the back side of the motor piston, and an insert secured in the recess defining a valve seat having a conical surface adapted for engagement by a head of the valve, said through passaging having a component extending through said insert; and auxiliary passaging comprising an internal recess in the motor cylinder, an annular peripheral groove in the motor piston and a passage from said annular peripheral groove to said longitudinally extending hole in the motor piston, said auxiliary passaging being adapted to deliver air under pressure from the back side of the motor piston to move the valve to its said through-passaging-unblocking position at the conclusion of a forward stroke of the motor piston.

* * * * *

UNITED STATES PATENT AND TRADEMARK OFFICE
CERTIFICATE OF CORRECTION

PATENT NO. : 6,736,292 B2
DATED : May 18, 2004
INVENTOR(S) : Ayzik Grach et al.

It is certified that error appears in the above-identified patent and that said Letters Patent is hereby corrected as shown below:

Column 7,
Line 18, "motor piston." should read -- motor piston; said longitudinally extending hole in the motor piston having a forward end portion formed as an auxiliary cyclinder, said valve having a valve-actuating piston slidable in said auxiliary cylinder, and a seal seated in a groove around said valve-actuating piston for sealing against an interior surface of the auxiliary cylinder, said seal having a recess therein opening toward the forward side of the motor piston. --.

Signed and Sealed this

Tenth Day of August, 2004

JON W. DUDAS
*Acting Director of the United States Patent and Trademark Office*